United States Patent
Nakao et al.

(10) Patent No.: US 10,812,195 B2
(45) Date of Patent: Oct. 20, 2020

(54) OPTICAL COMMUNICATION DEVICE (71) Applicant: SONY CORPORATION, Tokyo (JP)

(72) Inventors: Takashi Nakao, Tokyo (JP); Kyohei Iwamoto, Tokyo (JP); Taiji Ito, Kanagawa (JP); Tamotsu Ishii, Kanagawa (JP); Mitsuhiro Ueno, Tokyo (JP); Shinji Ohta, Kanagawa (JP); Takeshi Sano, Saitama (JP); Keiichi Shibata, Tokyo (JP); Yasuyuki Takeshita, Tokyo (JP); Hiromitsu Komatsu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/474,271

(22) PCT Filed: Dec. 26, 2017

(86) PCT No.: PCT/JP2017/046531
§ 371 (c)(1),
(2) Date: Jun. 27, 2019

(87) PCT Pub. No.: WO2018/128118
PCT Pub. Date: Jul. 12, 2018

(65) Prior Publication Data
US 2020/0127738 A1 Apr. 23, 2020

(30) Foreign Application Priority Data
Jan. 5, 2017 (JP) .................. 2017-000337

(51) Int. Cl.
*H04B 10/00* (2013.01)
*H04B 10/50* (2013.01)
(Continued)

(52) U.S. Cl.
CPC ........... *H04B 10/5059* (2013.01); *H04B 1/03* (2013.01); *H04B 10/118* (2013.01)

(58) Field of Classification Search
CPC .............. H04B 10/112; H04B 10/1123; H04B 10/1125; H04B 10/114; H04B 10/1143;
(Continued)

(56) References Cited

U.S. PATENT DOCUMENTS 6,643,467 B1  11/2003  Presby et al.
7,366,420 B2 *  4/2008  Yoshimi ............. H04B 10/1125
                                                        359/259

(Continued)

FOREIGN PATENT DOCUMENTS

EP  1195926 A1  4/2002
EP  1744475 A1  1/2007
(Continued)

OTHER PUBLICATIONS

International Search Report and Written Opinion of PCT Application No. PCT/JP2017/046531, dated Mar. 27, 2018, 11 pages of ISRWO.

*Primary Examiner* — Hanh Phan
(74) *Attorney, Agent, or Firm* — Chip Law Group (57) ABSTRACT

An optical communication device, for performing communication between spatially separated points by using one or more laser beams, includes an angle correction device that corrects a direction of a light receiving system and an emission optical axis correction device, in which an angle error which is not corrected by the angle correction device is detected by a light receiving angle detection device, and the emission optical axis correction device is controlled according to a detected error amount, and an emission optical axis is corrected.

8 Claims, 10 Drawing Sheets

(51) Int. Cl.
*H04B 1/03* (2006.01)
*H04B 10/118* (2013.01)

(58) Field of Classification Search
CPC .......... H04B 10/1149; H04B 10/25753; H04B 10/118
USPC ....... 398/118, 119, 120, 121, 122, 124, 127, 398/128, 129, 130, 131, 158, 159, 135, 398/136, 115
See application file for complete search history.

(56) References Cited

U.S. PATENT DOCUMENTS

| | | | |
|---|---|---|---|
| 2001/0043380 A1* | 11/2001 | Ohtsubo | ............ H04B 10/1125 398/118 |
| 2004/0202482 A1 | 10/2004 | Usui et al. | |
| 2005/0265724 A1 | 12/2005 | Sakanaka et al. | |
| 2006/0239675 A1 | 10/2006 | Iizuka et al. | |

FOREIGN PATENT DOCUMENTS

| | | |
|---|---|---|
| JP | 04-016029 A | 1/1992 |
| JP | 2002-111592 A | 4/2002 |
| JP | 2002-164853 A | 6/2002 |
| JP | 2004-312699 A | 11/2004 |
| JP | 2005-341494 A | 12/2005 |
| JP | 2005-354335 A | 12/2005 |
| JP | 2009-027747 A | 2/2009 |

\* cited by examiner

OPTICAL COMMUNICATION DEVICE

CROSS REFERENCE TO RELATED APPLICATIONS

This application is a U.S. National Phase of International Patent Application No. PCT/JP2017/046531 filed on Dec. 26, 2017, which claims priority benefit of Japanese Patent Application No. JP 2017-000337 filed in the Japan Patent Office on Jan. 5, 2017. Each of the above-referenced applications is hereby incorporated herein by reference in its entirety.

TECHNICAL FIELD

The present technology relates to an optical communication device applied to communication between ground and a satellite and/or between satellites.

BACKGROUND ART

Communication between spatially separated points on the ground by using laser beams has been already put to practical use. In the future, communication between the ground and an artificial satellite and optical communication between artificial satellites are required. In these cases, since a communication distance is extremely long, consideration for receiving laser beams from a communication partner has been required. For example, in Patent Document 1 below, a laser communication device is proposed which stabilizes a light receiving strength fluctuation even in a case where the laser communication device is affected by an atmospheric fluctuation.

As described above, in a case where the communication distance is extremely long, it is important to stabilize the strength and enhance accuracy of a laser beam transmission direction. Patent Document 1 described above considers about a change in the strength caused by a directional error. However, Patent Document 1 does not mention or indicate a point that the direction accuracy is further enhanced. Moreover, as a method for controlling a light transmission direction in space optical communication, Patent Document 2 proposes a method for using a mirror when received light is guided to a light receiver.

CITATION LIST

Patent Document

Patent Document 1: Japanese Patent Application Laid-Open No. 2005-354335
Patent Document 2: Japanese Patent Application Laid-Open No. 2002-111592

SUMMARY OF THE INVENTION

Problems to be Solved by the Invention

However, in a case where an angle of a reception optical system is corrected with respect to received light, in a case where a transmission and reception systems are integrated, there has been a problem in that an angle correction error turns to be an emission angle error and efficient communication cannot be performed. Moreover, in optical axis control by mirror control, since an optical axis is reflected by a mirror and bent, a large space is required. Moreover, it is necessary to arrange the mirror in each of the X axis and the Y axis, and high accuracy is required for controlling the mirrors. Therefore, there has been a disadvantage such that an entire optical system becomes more complicated and has a larger size. Moreover, there has been a disadvantage such that control in the Z axis direction cannot be performed in a case where the optical axis is controlled by the mirrors.

An object of the present technology is to provide an optical communication device which is capable of not only miniaturizing and simplifying an optical system than a conventional optical system and capable of realizing higher stability.

Solutions to Problems

The present technology is an optical communication device for performing communication between spatially separated points by using one or more laser beams, the optical communication device including an angle correction device that corrects a direction of a light receiving system and an emission optical axis correction device, in which an angle error which is not corrected by the angle correction device is detected by a light receiving angle detection device, and the emission optical axis correction device is controlled according to a detected error amount, and an emission optical axis is corrected.

Furthermore, the present technology is an optical communication device, in which each of an emission optical device and a light receiving optical device includes a light detector for detecting an optical axis, a gimbal device is driven and controlled by a received optical axis detection signal obtained in the light receiving optical device, an XY axes control actuator is driven and controlled by a signal of a reception signal detection unit obtained in the light receiving optical device, and the XY axes control actuator and a Z axis control actuator are driven and controlled by an emission optical axis detection signal obtained in the emission optical device.

Effects of the Invention

According to at least one embodiment, an optical system can be miniaturized and simplified, and in addition, higher accuracy can be realized. Note that the effects described herein are not necessarily limited and that the effect may be any effects described in the present technology or an effect different from the above effects.

MODE FOR CARRYING OUT THE INVENTION

An embodiment to be described below is a preferable specific example of the present technology, and various technically preferable limitations are applied. However, in the following description, the scope of the present technology is not limited to the embodiment, unless there is a statement to particularly limit the present technology.

Note that the description on the present technology will be made in the following order.

<1. Embodiment>
<2. Modification>

1. Embodiment

Figure 1:
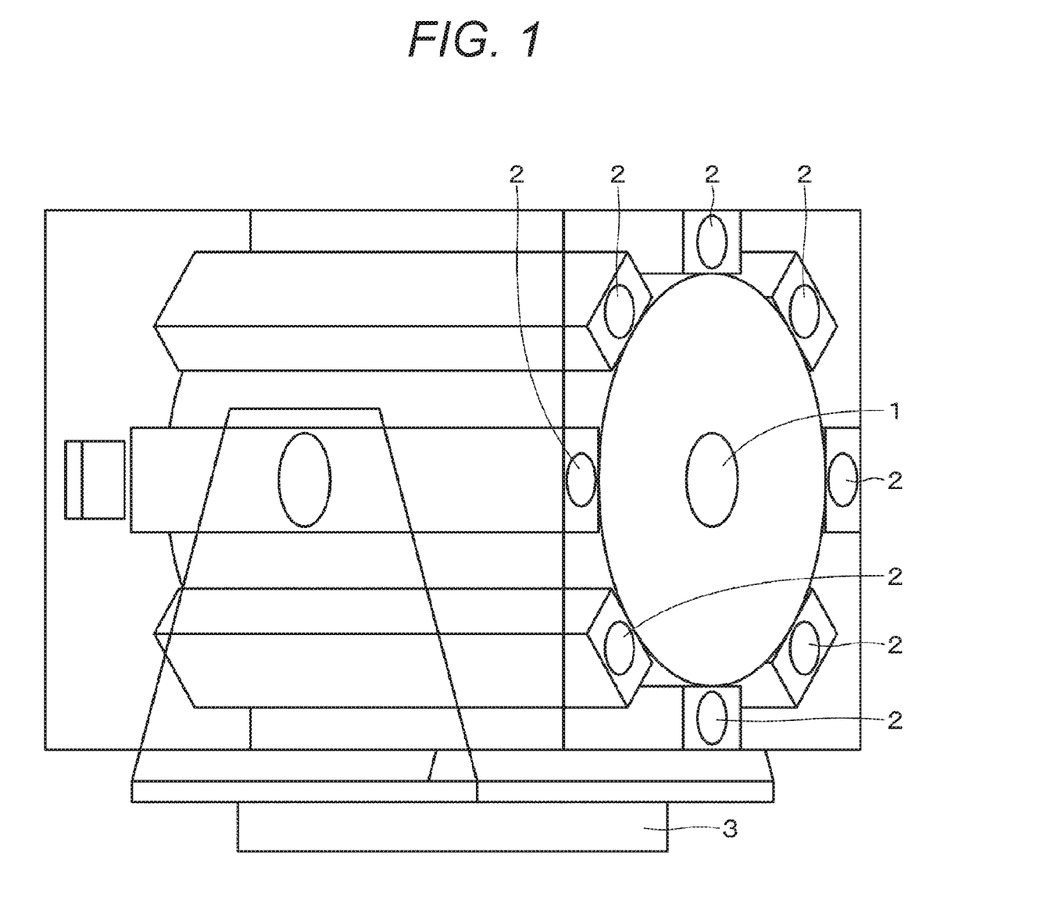
FIG. 1 is a schematic diagram for explaining an outline of an example of an optical communication device to which the present technology can be applied.

In FIG. 1, an outline of an embodiment of a space optical communication device according to the present technology is illustrated. The embodiment has a configuration in which a light receiving optical device 1 and an emission optical device 2 are separately provided. A plurality of, for example, eight emission optical devices 2 are provided at equal angular intervals around the light receiving optical device 1. An angle of the entire configuration in which the transmission and reception optical systems are integrated is controlled so that the entire configuration is directed to a transmission and reception optical system of a communication partner by a gimbal mechanism 3.

The emission optical device 2 emits a laser beam modulated by a transmission signal to the communication partner. The plurality of emission optical devices 2 is driven in synchronization with each other so as to add outputs and obtain a high output. The laser beam from the communication partner is received by the light receiving optical device 1, and a reception signal is obtained. Note that, in FIG. 1, as an example, the configuration including the eight emission optical devices 2 is illustrated. However, the number of emission optical devices 2 is not limited to this and can be arbitrarily set.

Figure 2:
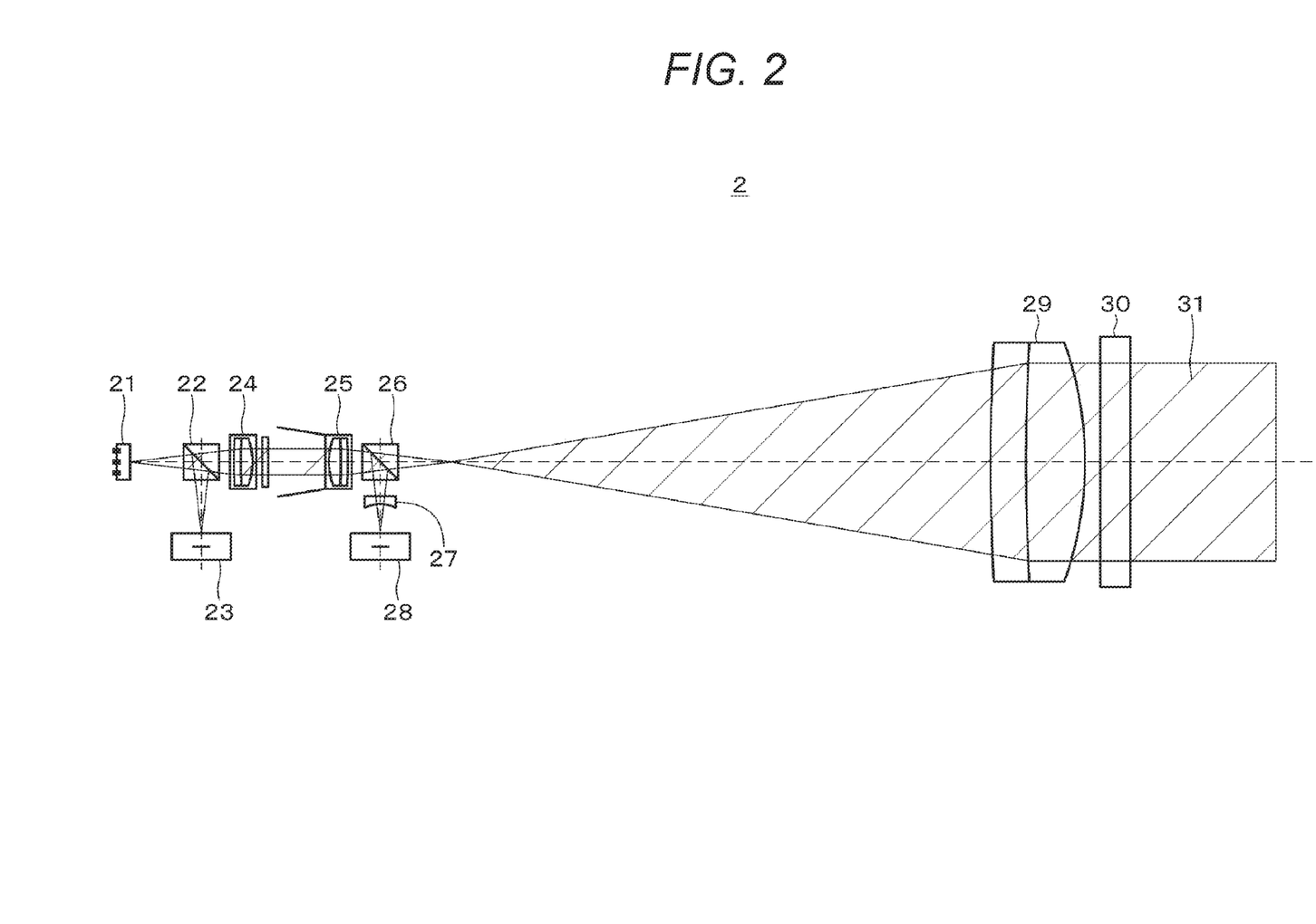
FIG. 2 is a schematic diagram illustrating a configuration of an optical system of an emission optical device according to the embodiment of the present technology.

In FIG. 2, a configuration of an example of the emission side optical device 2 used in the space optical communication device is illustrated. A part of transmission light (laser beam) emitted from a laser generator, for example, a laser diode 21 is reflected by a beam splitter 22 and enters a light detector 23.

Moreover, light passed through the beam splitter 22 passes through an actuator mounting a Z axis control lens 24 (referred to as Z axis control actuator 24), and passes through an actuator mounting an XY axes control lens 25 (referred to as XY axes control actuator 25). Thereafter, the light is separated into light for controlling an optical axis and emission light by a beam splitter 26. Here, the Z axis indicates the optical axis, and the XY axes indicate axes orthogonal to the optical axis and orthogonal to each other.

The light passed through the XY axes control actuator 25 is once focused, and then, is diffused again and converted into parallel light by an emission lens 29. After the light passes through a filter 30, the light is emitted as emission light 31. The emission lens 29 has a larger aperture than the Z axis control actuator 24 and the XY axes control actuator 25. Therefore, the emission lens 29 has effects of miniaturizing the size of the emission optical system and reducing the diffusion of the emission light. The filter 30 has a role for reducing an electromagnetic wave, having a wavelength different from that of the emission light, which enters the optical system from outside.

After astigmatism has been applied by a cylindrical lens 27, the light for controlling the optical axis which is reflected by the beam splitter 26 enters a light detector 28. The light detector 28 has a region divided into four portions in a square shape illustrated in FIG. 3. By receiving a luminous flux to which the astigmatism has been applied by the cylindrical lens 27, the light detector 28 detects fluctuations in the Z axis and the XY axes of the luminous flex by using the astigmatism method.

Figure 3:
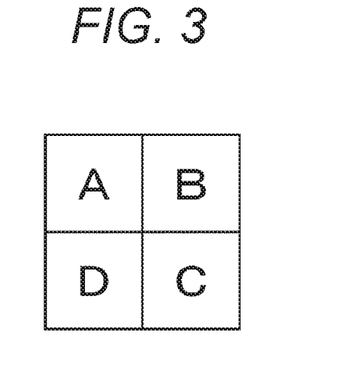
FIG. 3 is a schematic diagram used for explaining a light detector.

From the luminous flex which has entered the light detector 28, signals with fluctuations in XYZ axes are obtained as follows by using the astigmatism method. Each of the references A to D indicates an electrical signal having a level according to a light receiving amount of each region.

Z axis shift: A+C−(B+D)   (Equation 1)

X axis shift: A+D−(B+C)   (Equation 2)

Y axis shift: A+B−(C+D)   (Equation 3)

Figure 4:
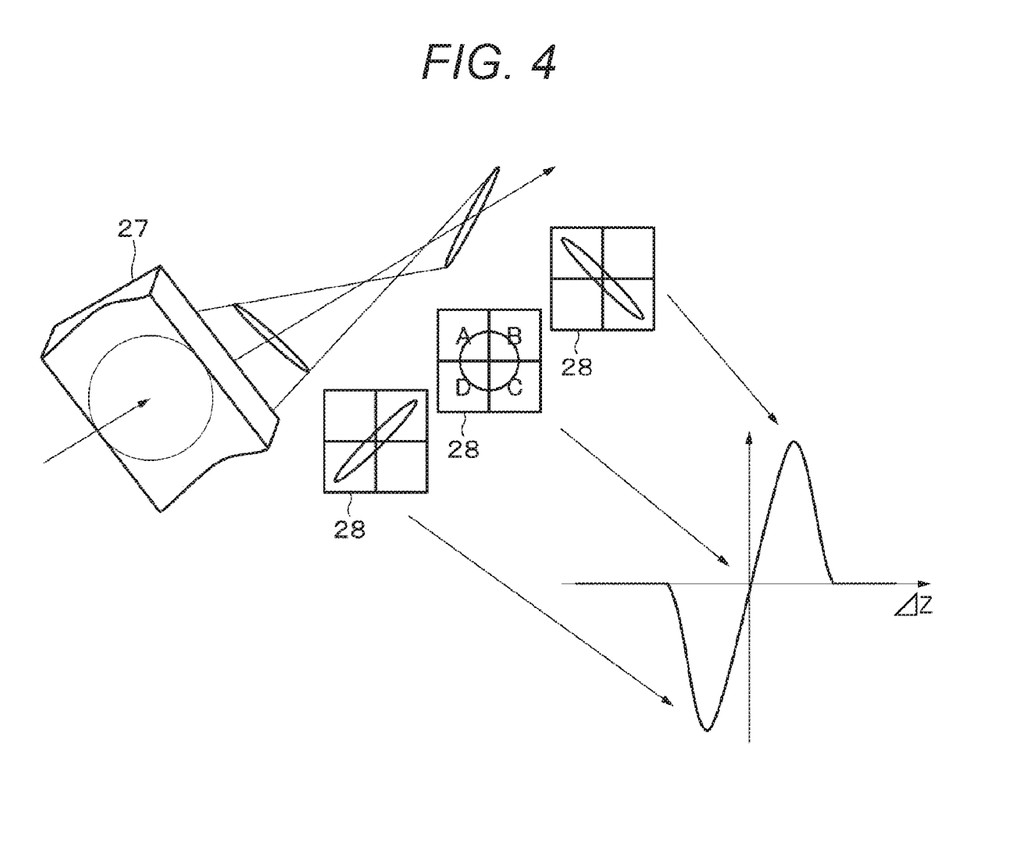
FIG. 4 is a schematic diagram used for explaining a detection operation of the light detector.

FIG. 4 illustrates a signal with the Z axis fluctuation by the astigmatism method (so-called S-shaped signal).

By using the XYZ control signal obtained in this way, feedback control of the Z axis control actuator 24 and the XY axes control actuator 25 is performed.

Figure 5:
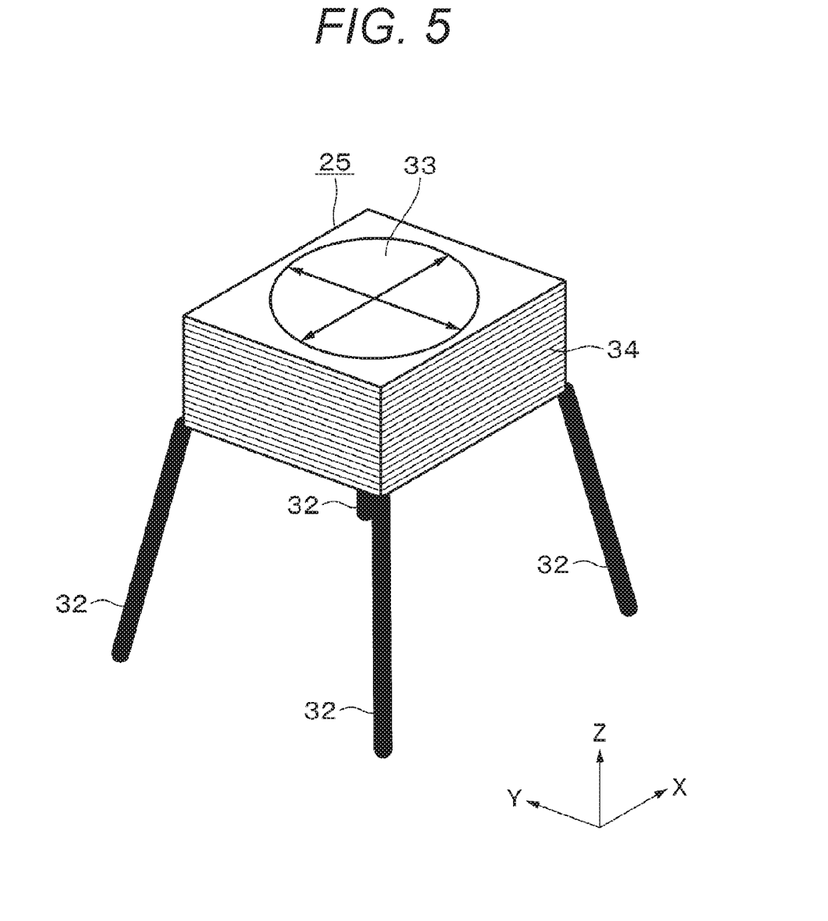
FIG. 5 is a perspective view illustrating a configuration of an example of an XY axes control actuator.

Note that, as illustrated in FIG. 5, the XY axes control actuator 25 has a structure in which a drive unit wound by a coil 34 is supported by a plurality of leg-like support mechanisms 32 extending in a substantially Z axis direction so that a position of a lens 33 in the XY axis directions can be controlled.

Figure 6:
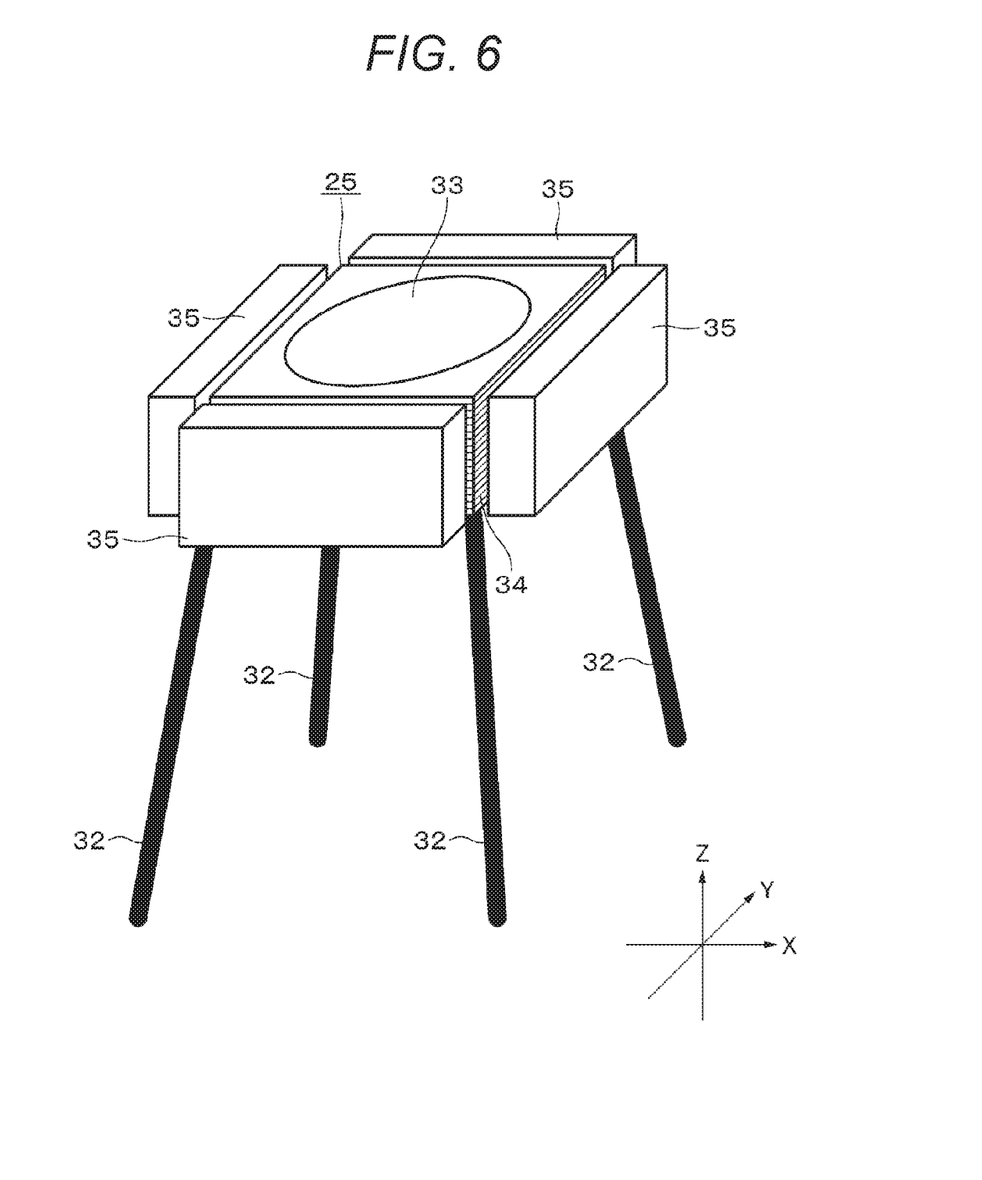
FIG. 6 is a perspective view illustrating a configuration of an example of the XY axes control actuator.

As illustrated in FIG. 6, a specific example of the XY axes control actuator 25 has a structure in which the drive unit wound by the coil 34 is supported by the plurality of support mechanisms 32 extending in the substantially Z axis direction and the drive unit is surrounded by four magnets 35, and the XY axes control actuator 25 is driven in the X axis direction and the Y axis direction by electromagnetic drive.

Figure 7:
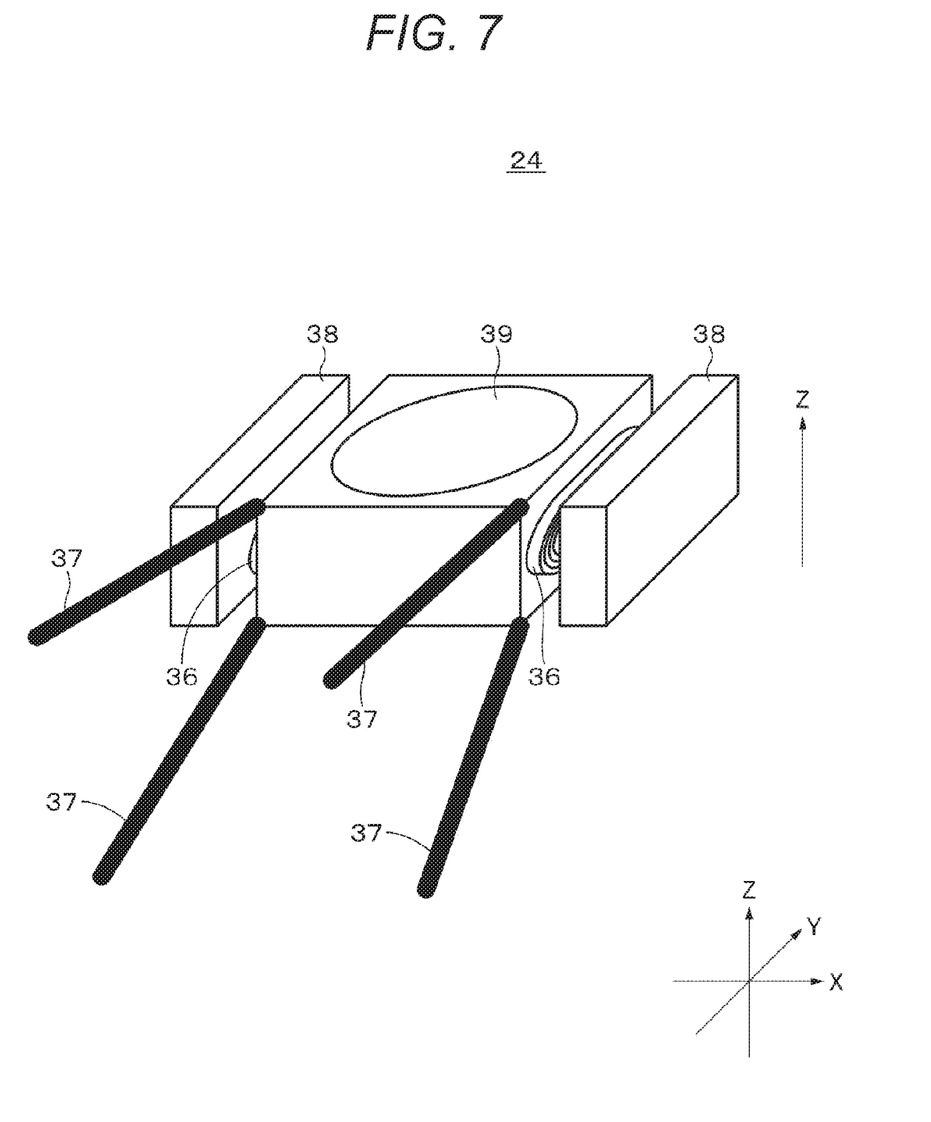
FIG. 7 is a perspective view illustrating a configuration of an example of a Z axis control actuator.

As illustrated in FIG. 7, the Z axis control actuator 24 has a structure in which a drive unit wound by a coil 36 is supported by a support mechanism extending in a horizontal direction and two magnets 38 are provided around the drive unit, and a lens 39 is driven in the Z axis direction by electromagnetic drive. Note that the Z axis control actuator 24 may have a structure other than a suspension method illustrated in FIG. 7, such as a voice coil method.

Figure 8:
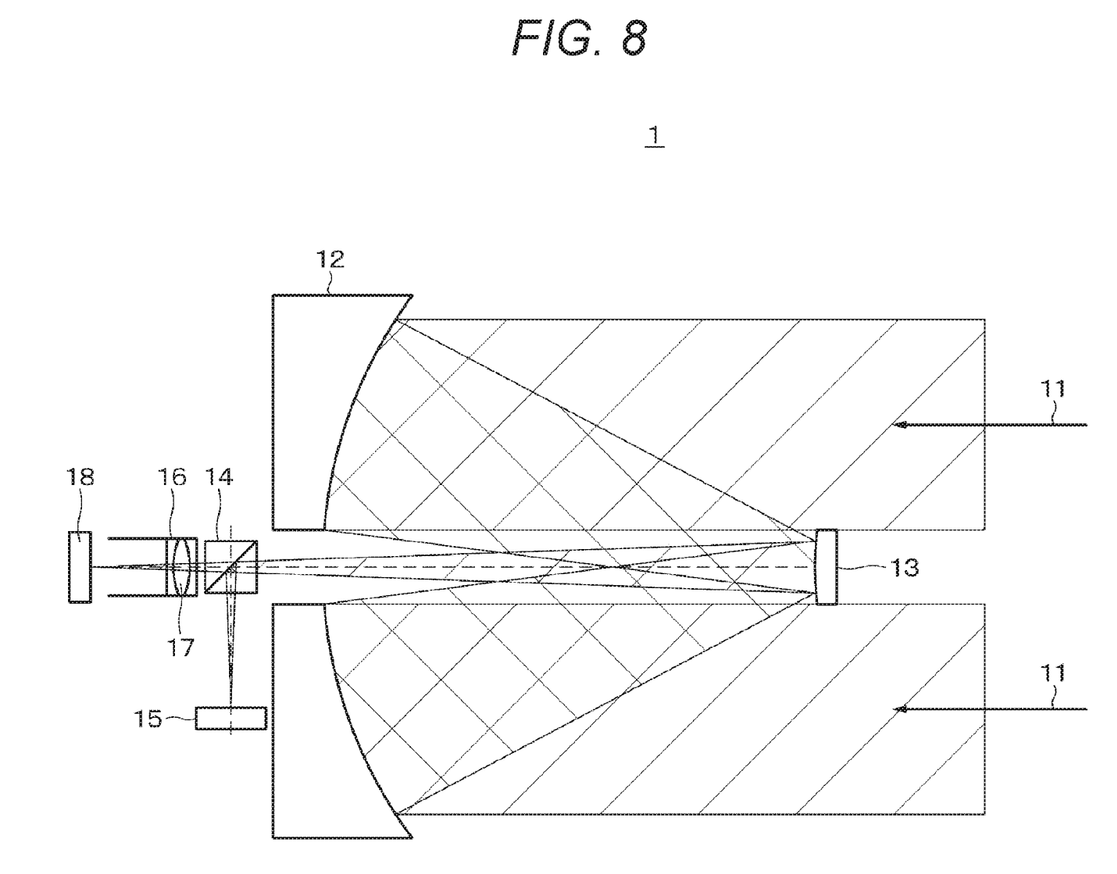
FIG. 8 is a schematic diagram illustrating a configuration of an optical system of a light receiving optical device according to the embodiment of the present technology.

In FIG. 8, a configuration of the light receiving optical device 1 used in the space optical communication device is illustrated. After the emission light 31 emitted from the emission optical device 2 described above propagates in a space, the emission light 31 enters the light receiving optical system. Received light 11 is converged by a reflection-type lens main mirror 12 and a reflection-type lens sub mirror 13 and is divided into two light paths by a beam splitter 14.

A luminous flex reflected by the beam splitter 14 of the divided paths enters an incident light XY axes detector (for example, photodiode) 15. After light which has passed through the beam splitter 14 transmits an XY axes control lens 17 mounted in an XY axes control actuator 16, the light enters a signal detector (for example, photodiode) 18.

Here, similarly to the light detector 28, each of the incident light XY axes detector 15 and the signal detector 18 has four-divided regions as illustrated in FIG. 3. Furthermore, similarly to the XY axes control actuator 25, the XY axes control actuator 16 has the structure illustrated in FIG. 5 or 6.

In a case where an entire light receiving system is inclined with respect to the optical axis of the received light 11, spot positions on the incident light XY axes detector 15 and the signal detector 18 shift. The shift is detected by calculation indicated in the Equations 2 and 3, and an XY axis error signal of the incident light XY axes detector 15 is used to control the gimbal mechanism 3 (referred to FIG. 1) which controls the inclination of the entire light receiving system.

Furthermore, by controlling the XY axes control actuator 16 by using the XY axis error signal detected by the signal detector 18, even in a case where there is a control error of the gimbal mechanism 3, it is possible to prevent a light spot from moving out from a light receiving surface of the signal detector 18. Note that a reception signal can be obtained by adding light receiving amounts of the four regions of the signal detector 18.

Here, by making a spot size on the incident light XY axes detector 15 be larger than a spot size on the signal detector 18, an angle detection range of the incident light XY axes detector 15 is widened, and angle control accuracy of the gimbal mechanism 3 is relaxed, and by providing the XY axes control actuator 16, it is possible to reduce an area of the signal detector 18 and raise a signal detection band. Furthermore, since the emission optical device and the light receiving optical device are integrated, in a case where there is an angle control error of the gimbal mechanism 3, an error of the emission optical axis is generated.

Therefore, by controlling the optical axis of the emission optical device by an appropriate amount according to the gimbal control error detected by the incident light XY axes detector 15, it is possible to correct the emission optical axis error. Moreover, by arranging an actuator and a light detector for controlling an actuator in the transmission and the reception optical system, even in a case where the optical system is deformed due to an influence of a temperature and the like, it is possible to make a correction by using the actuator.

Figure 9:
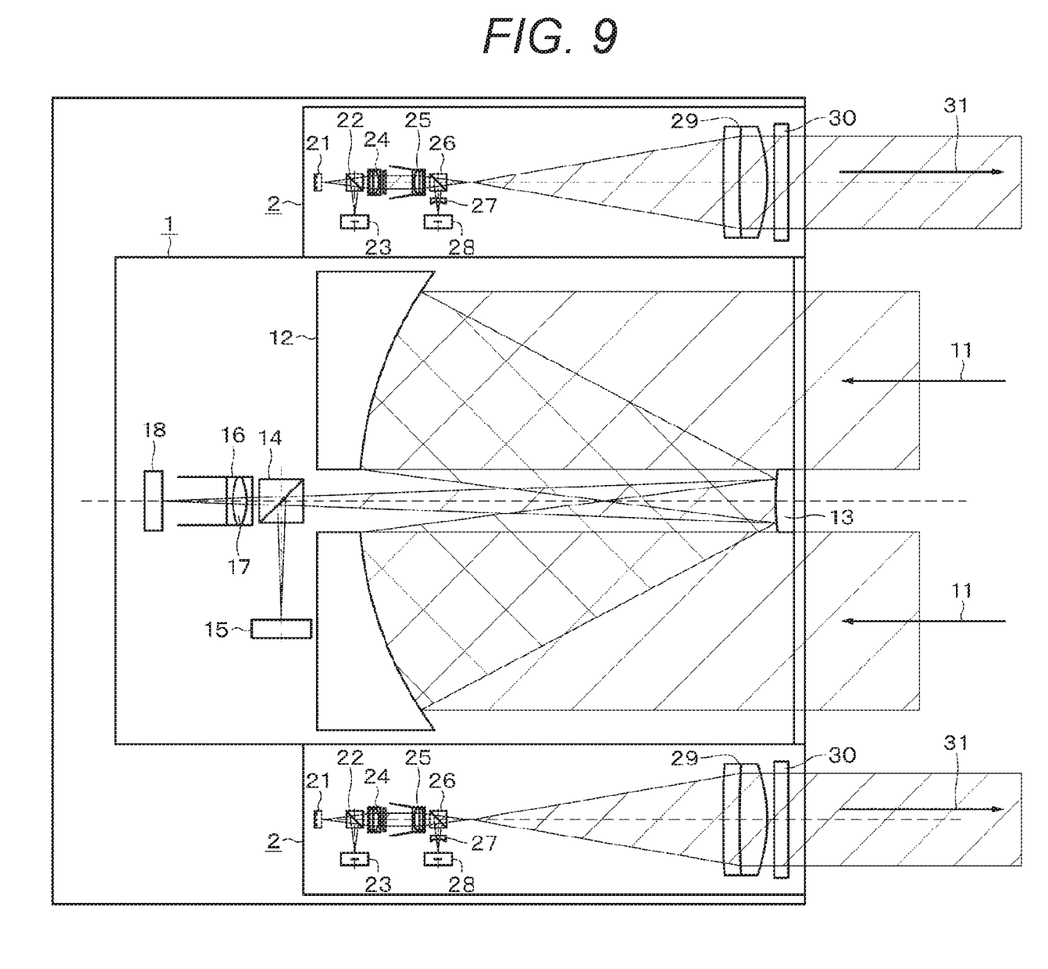
FIG. 9 is a schematic diagram illustrating both of an emission optical system and a light receiving optical system.

FIG. 9 is a single drawing in which the light receiving optical device 1 and the emission optical device 2 are illustrated.

Figure 10:
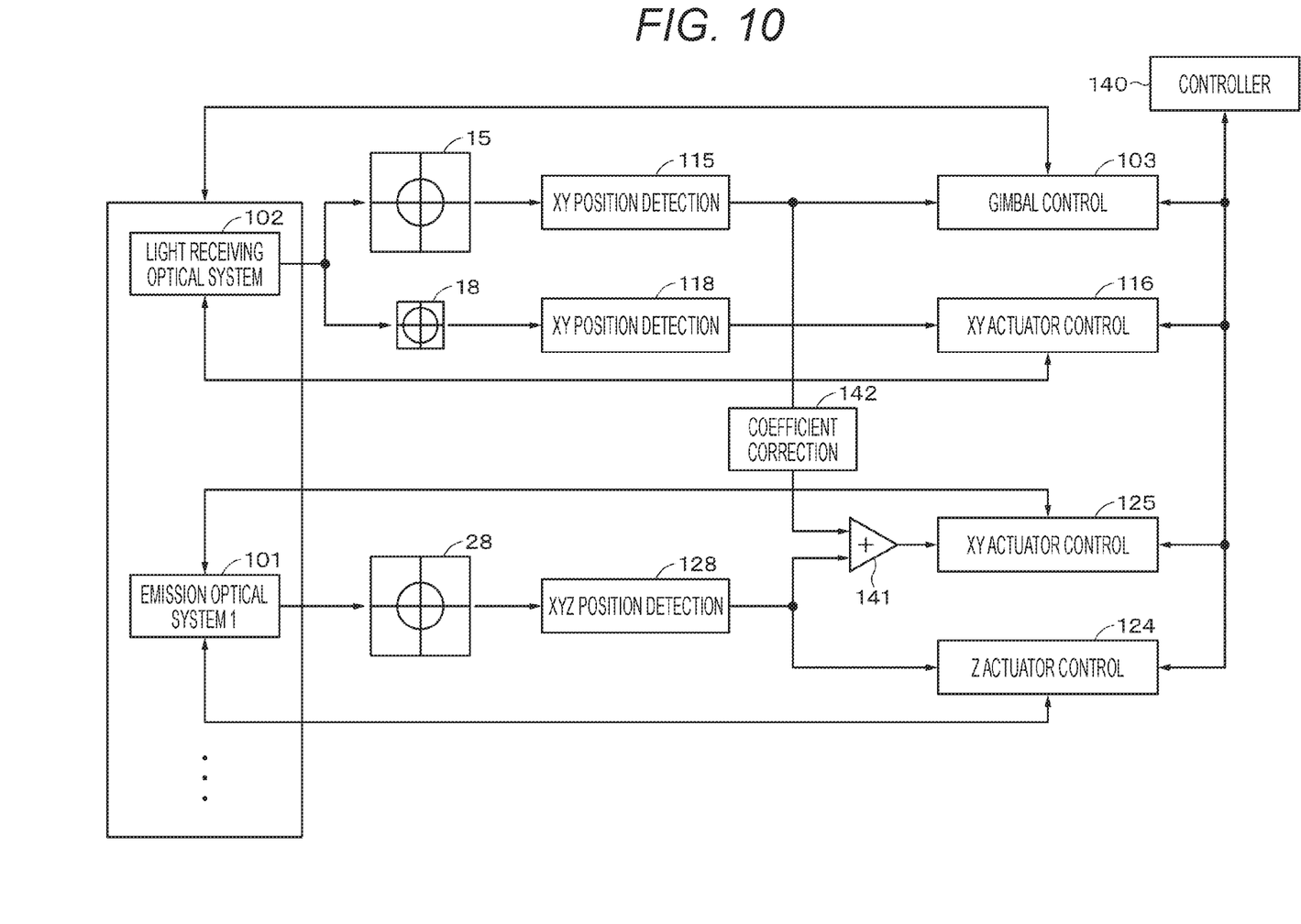
FIG. 10 is a block diagram of the embodiment of the present technology.

In FIG. 10, a control block diagram of an embodiment is illustrated. Only one of the plurality of emission optical devices 2 is illustrated. Feedback control regarding the X direction, the Y direction, and the Z direction is performed on each of the plurality of emission optical devices. Note that, in a case where the plurality of emission optical devices is included, by stopping outputs of the emission optical devices one by one and confirming a change in an amount of received light of a partner satellite, a state of each of the emission systems may be detected. Furthermore, by scanning the optical axes of the plurality of emission systems one by one and confirming a light receiving state of the partner satellite, it is possible to align the emission optical axes of the respective emission systems.

In FIG. 10, a controller 140 controls an operation of an entire control system. An XYZ position detector 128 is connected to the light detector 28 related to an emission optical system 101, and a signal in a position in each direction is obtained.

An XY position signal is supplied to an adder 141. An output of the adder 141 is supplied to an XY actuator control circuit 125 for controlling the XY axes control actuator 25. A Z position signal from the XYZ position detector 128 is supplied to a Z actuator control circuit 124 for controlling the Z axis control actuator 24.

The incident light XY axes detector 15 and the signal detector 18 are provided in association with a light receiving optical system 102. An XY position detector 115 is connected to the incident light XY axes detector 15, and signals at positions in the X direction and the Y direction are obtained. The XY position signal detected by the XY position detector 115 is supplied to a gimbal control circuit 103, and an angle of the gimbal mechanism 3 is controlled.

The XY position signal detected by the XY position detector 115 is supplied to the adder 141 via a coefficient correction circuit 142. The coefficient correction circuit 142 makes a control amount to be applied to the XY axes control actuator 25 of the emission optical device 2 appropriate. With this path, by controlling the optical axis of the emission optical device by an appropriate amount according to the gimbal control error detected by the incident light XY axes detector 15, it is possible to correct the emission optical axis error. Note that the appropriate amount for driving an emission optical axis correction mechanism is obtained by multiplying an angle correction error detected by a light receiving angle detection mechanism by a coefficient.

An XY position detector 118 is connected to the signal detector 18, and signals at positions in the X direction and the Y direction are obtained. The XY position signal detected by the XY position detector 118 is supplied to an XY actuator control circuit 116, and the XY axes control actuator 16 is controlled.

According to the present technology described above, the following effects can be obtained.

1) An angle error which cannot be corrected by an angle correction mechanism for correcting a direction of a light receiving system is detected by an angle detection mechanism, and an emission optical axis correction mechanism is driven by an appropriate amount according to the error amount, and an emission optical axis is corrected.

2) In an optical device in (1), the appropriate amount by which the emission optical axis correction mechanism is driven is obtained by multiplying an angle correction error detected by a light receiving angle detection mechanism by a coefficient.

With this configuration, even in a case where gimbal control accuracy is insufficient, the emission optical axis can be controlled with high accuracy.

In addition,

3) The optical axis is controlled by driving the lens in the optical device in (1).

4) The optical axis control actuator in (3) has a plurality of support mechanisms extending in the substantially Z axis direction.

With this configuration, an optical system can be arranged one-dimensionally and the number of components can be reduced than a configuration in which the angles of the XY axes are controlled by a mirror as in the related art.

As a result, the optical system can be miniaturized and simplified.

In addition, it is possible to detect and correct of an error in the Z axis direction which cannot be realized in the realized art.

Furthermore,

5) A lens position is controlled by using information regarding a position where light which has passed through a driving lens in (3) enters a light detector provided in an optical system.

With this configuration, feedback control of an actuator is performed, and it is possible to detect and correct the emission optical axis error caused by distortion of the optical system.

According to the present technology, the optical system not only can be more miniaturized and simplified than the conventional optical system and but also can realize higher stability.

2. Modification

One embodiment of the present technology has been specifically described above. However, the present technology is not limited to the above-mentioned embodiment, and various kinds of modifications based on technical ideas of the present technology are possible. For example, it is not necessary to integrate the emission optical device and the light receiving optical device. Furthermore, the configuration, method, process, shape, material, value, and the like described in the embodiment are merely exemplary, and different configurations, methods, processes, shapes, materials, values, and the like may be used as necessary.

Note that, the present technology can have the following configuration.

Figure 11:
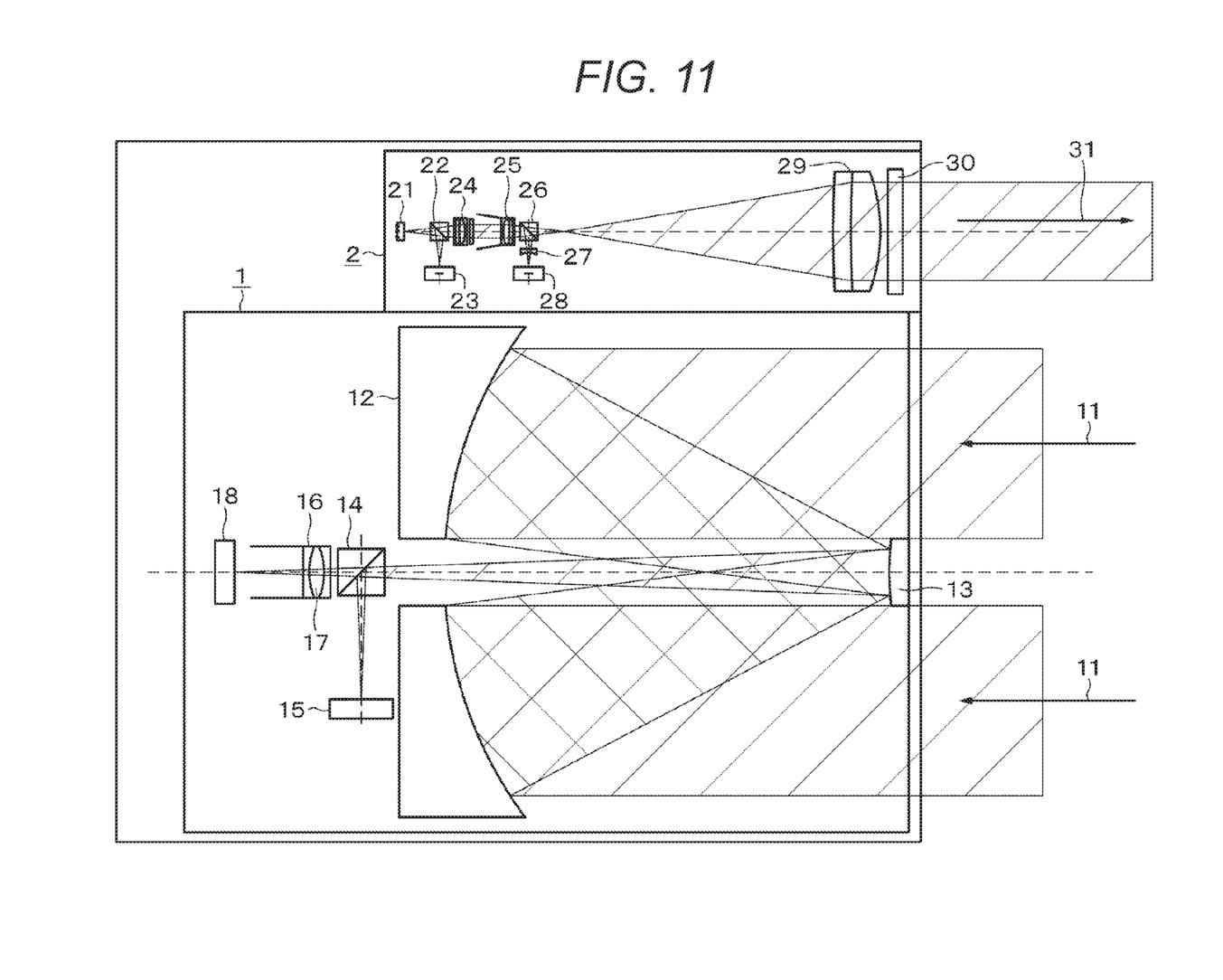
FIG. 11 is a schematic diagram illustrating a configuration of an example using a single emission optical system and a single light receiving optical system.

FIG. 11 is an example using a single transmission system and a single reception system. By adopting this configuration, although an emission light output is smaller than a case where a plurality of transmission optical systems is provided in parallel, it is possible to miniaturize the entire system and realize lower power consumption. Furthermore, since a single transmission optical system is provided, there are advantages such that it is not necessary to synchronously drive a plurality of lasers and the optical axis can be easily adjusted.

Note that, the present technology can have the following configuration.

(1)

An optical communication device for performing communication between spatially separated points by using one or more laser beams, the optical communication device including:

an angle correction device configured to correct a direction of a light receiving system; and an emission optical axis correction device, in which an angle error which is not corrected by the angle correction device is detected by a light receiving angle detection device, and the emission optical axis correction device is controlled according to a detected error amount, and an emission optical axis is corrected.

(2)

The optical communication device according to (1), in which an amount for driving the emission optical axis correction device is obtained by multiplying an angle correction error component detected by the light receiving angle detection device by a coefficient.

(3)

The optical communication device according to (1) or (2), in which the emission optical axis correction device controls the emission optical axis by controlling a position of a lens.

(4)

The optical communication device according to any one of (1) to (3), in which the emission optical axis correction device includes a plurality of support mechanisms extending in a substantially Z axis direction.

(5)

The optical communication device according to (3), in which a lens position control is performed by using light spot positional information where light which has passed through the lens enters a light detector provided in an optical system.

(6)

An optical communication device, in which each of an emission optical device and a light receiving optical device includes a light detector for detecting an optical axis, a gimbal device is driven and controlled by a received optical axis detection signal obtained in the light receiving optical device, an XY axes control actuator is driven and controlled by a signal of a reception signal detection unit obtained in the light receiving optical device, and the XY axes control actuator and a Z axis control actuator are driven and controlled by an emission optical axis detection signal obtained in the emission optical device.

(7)

The optical communication device according to (6), in which the emission optical device and the light receiving optical device are integrated.

(8)

The optical communication device according to (6) or (7), in which a plurality of the emission optical devices is provided.

REFERENCE SIGNS LIST

1 Light receiving optical device
2 Emission optical device
3 Gimbal mechanism
11 Received light
14 Beam splitter
15 Incident light XY axes detector
16 XY axes control actuator
18 Signal detector
21 Laser diode
23 Light detector
24 Z axis control actuator
25 XY axes control actuator
31 Emission light
28 Light detector

The invention claimed is:

1. An optical communication device for performing communication between spatially separated points based on one or more laser beams, the optical communication device comprising:

an angle correction device configured to correct a direction of a light receiving system; and an emission optical axis correction device configured to control an emission optical axis based on control of a position of a lens, wherein an angle error of the direction of the light receiving system which is not corrected by the angle correction device is detected by a light receiving angle detection device, the emission optical axis correction device is controlled based on a detected error amount detected by the light receiving angle detection device, and the emission optical axis is corrected based on the control of the emission optical axis correction device.

2. The optical communication device according to claim 1, wherein
an amount to drive the emission optical axis correction device is obtained based on multiplication of an angle correction error component by a coefficient, and
the angle correction error component is detected by the light receiving angle detection device.

3. The optical communication device according to claim 1, wherein the emission optical axis correction device includes a plurality of support mechanisms that extends in a substantially Z axis direction.

4. The optical communication device according to claim 1, wherein
the position of the lens is controlled based on light spot positional information of a spot position, and
light which has passed through the lens enters a light detector provided in an optical system at the spot position.

5. An optical communication device, comprising:
an emission optical device;
a light receiving optical device, wherein each of the emission optical device and the light receiving optical device includes a light detector configured to detect an optical axis; and
a gimbal device configured to be driven and controlled based on a received optical axis detection signal obtained in the light receiving optical device, wherein
the light receiving optical device further includes:
a reception signal detection unit; and
a first XY axes control actuator configured to be driven and controlled based on a signal of the reception signal detection unit, and
the emission optical device further includes:
a second XY axes control actuator; and
a Z axis control actuator, wherein the second XY axes control actuator and the Z axis control actuator are configured to be driven and controlled based on an emission optical axis detection signal obtained in the emission optical device.

6. The optical communication device according to claim 5, wherein the emission optical device and the light receiving optical device are integrated.

7. The optical communication device according to claim 5, further comprising a plurality of emission optical devices.

8. An optical communication device for performing communication between spatially separated points based on one or more laser beams, the optical communication device comprising:
an angle correction device configured to correct a direction of a light receiving system; and
an emission optical axis correction device including a plurality of support mechanisms that extends in a substantially Z axis direction, wherein
an angle error of the direction of the light receiving system which is not corrected by the angle correction device is detected by a light receiving angle detection device,
the emission optical axis correction device is controlled based on a detected error amount detected by the light receiving angle detection device, and
an emission optical axis is corrected based on the control of the emission optical axis correction device.

* * * * *